US006924451B2

(12) United States Patent
Hanson

(10) Patent No.: US 6,924,451 B2
(45) Date of Patent: Aug. 2, 2005

(54) METHOD FOR SEQUENTIALLY ORDERING OBJECTS USING A SINGLE PASS DELIVERY POINT PROCESS

(75) Inventor: Bruce H. Hanson, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 61 days.

(21) Appl. No.: 10/265,570

(22) Filed: Oct. 8, 2002

(65) Prior Publication Data

US 2004/0065597 A1 Apr. 8, 2004

(51) Int. Cl.[7] .................................... B65G 47/30
(52) U.S. Cl. .............................. 209/584; 209/900
(58) Field of Search ........................ 209/583, 584, 209/900; 198/418, 418.6, 432

(56) References Cited

U.S. PATENT DOCUMENTS

| | | | | | |
|---|---|---|---|---|---|
| 3,184,061 | A | * | 5/1965 | Levy | 209/552 |
| 4,247,008 | A | * | 1/1981 | Dobbs | 209/569 |
| 4,507,739 | A | * | 3/1985 | Haruki et al. | 700/224 |
| 5,101,981 | A | * | 4/1992 | Carbone et al. | 209/548 |
| 5,119,954 | A | | 6/1992 | Svyatsky et al. | |
| 5,353,912 | A | | 10/1994 | Killer et al. | |
| 5,363,971 | A | | 11/1994 | Weeks et al. | |
| 5,718,321 | A | * | 2/1998 | Brugger et al. | 198/359 |
| 6,241,099 | B1 | | 6/2001 | Hendrickson et al. | |
| 6,283,304 | B1 | * | 9/2001 | Gottlieb et al. | 209/603 |
| 6,316,741 | B1 | | 11/2001 | Fitzgibbons et al. | |
| 6,501,041 | B1 | * | 12/2002 | Burns et al. | 209/584 |
| 6,555,776 | B2 | * | 4/2003 | Roth et al. | 209/584 |
| 2002/0139726 | A1 | | 10/2002 | Roth et al. | |
| 2003/0141226 | A1 | * | 7/2003 | Morikawa | 209/584 |
| 2003/0155282 | A1 | * | 8/2003 | Kechel | 209/584 |

* cited by examiner

*Primary Examiner*—Donald P. Walsh
*Assistant Examiner*—Joseph Rodriguez
(74) *Attorney, Agent, or Firm*—Greenblum & Bernstein, P.L.C.

(57) ABSTRACT

A method using a single pass sequencer having a transport system for transporting the mail pieces to a transport system having a first carriage system and a second carriage system with a plurality of holders slidable between the first carriage system and the second carriage system with packaged output. Each of the plurality of holders holding a mail piece of the mail pieces received from the transport system. The method includes assigning a code to: (i) the mail pieces based on the destination information, (ii) the plurality of holders on the first carriage, and (iii) a position on the second carriage which corresponds to the initial sequence and a destination sequence of the mail pieces. The method instructs movement of the plurality of holders from the first carriage to the second carriage based on the code assigned to the mail pieces, the plurality of holders on the first carriage and the position on the second carriage such that when the mail pieces are moved to the second carriage they are in sequential order of delivery destination, ready to be packaged.

22 Claims, 4 Drawing Sheets

METHOD FOR SEQUENTIALLY ORDERING OBJECTS USING A SINGLE PASS DELIVERY POINT PROCESS

BACKGROUND OF THE INVENTION

1. Field of the Invention

The present invention generally relates to a single pass sequencer process and in particular to a method for sequencing objects in a single pass such as mail pieces in order of delivery using a single pass system.

2. Background Description

The delivery of mail such as catalogs, products, advertisements and a host of other articles have increased exponentially over the years. These mail pieces are known to be critical to commerce and the underlying economy. It is thus critical to commerce and the underlying economy to provide efficient delivery of such mail in both a cost effective and time efficient manner. This includes, for example, arranging randomly deposited mail pieces into a sequential delivery order for delivery to a destination point. By sorting the mail in a sequential order based on destination point, the delivery of mail and other articles can be provided in an orderly and effective manner.

In current sorting processes, optical character recognition systems may be used to capture delivery destination information. A host of feeders and other complex handling systems are then used to transport the mail to a host of bins or containers for sorting and future delivery. To this end, central processing facilities, i.e., United States Postal Service centers, have employed a high degree of automation using bar code readers and/or character recognition to perform basic sorting of articles to be transported to defined geographic regions or to local offices within those regions. It is also known to manually sort mail pieces, but this process is very labor intensive, time consuming and costly.

As to known automated sorting processes, currently, for example, a two pass algorithm process is used as one method for sorting mail based on delivery destination. In this known process, a multiple pass process of each piece of mail is provided for sorting the mail; that is, the mail pieces, for future delivery, are fed through a feeder twice for sorting purposes. In general, the two pass algorithm method requires a first pass for addresses to be read by an optical character reader and assigned a label or destination code. Once the mail pieces are assigned a label or destination code, they are then fed to bins based on one of the numbers of the destination code. The mail pieces are then fed through the feeder a second time, scanned, and sorted based on the second number of the destination code. It is the use of the second number that completes the basis for sorting the mail pieces based on delivery or destination order.

The two pass algorithm method may present some shortcomings. For example, the mail pieces are fed through the feeder twice, which may increase the damage to the mail pieces. Second, known optical recognition systems typically have a reliability of approximately 70%; however, by having to read the mail pieces twice, the rate is multiplied by itself dramatically reducing the read rate and thus requiring more manual operations. That is, the read rate is decreased and an operator may have to manually read the destination codes and manually sort the mail when the scanner is unable to accurately read the destination code, address or other information associated with the mail pieces two consecutive times. Additionally, bar code labeling and additional sorting steps involves additional processing time and sorting machine overhead as well as additional operator involvement. This all leads to added costs and processing times.

It is also known that by using the two pass algorithm method as well as other processing methods, the containers and bins may not be efficiently utilized, thus wasting valuable space. By way of illustrative example, a first bin may not be entirely filled while other bins may be over-filled. In this scenario, the mail pieces are not uniformly stacked within the bins, wasting valuable space, causing spillage or an array of other processing difficulties.

The present invention is designed to overcome one or more of the above shortcomings.

SUMMARY OF THE INVENTION

In a first aspect of the present invention, a method for sorting objects such as mail pieces, flats, products and the like based on destination point is provided. The method includes reading destination information associated with objects and assigning a code based on the destination information to each of the objects. The objects are then each placed in one of a plurality of holders on a first carriage which are then assigned sorting criteria based on the code of the each of the objects within each of the plurality of holders. At least one of the plurality of holders is then moved from the first carriage to a corresponding position on a second carriage based on the sorting criteria to sequentially order the objects based on delivery destination.

In embodiments, the locations on the second carriage are assigned final sorting order information. The moving step is then based on an alignment of the sorting criteria and the final sorting order information. In further embodiments, the first carriage is incrementally rotated to align at least one of the plurality of holders with one of the locations on the second carriage based on the sorting criteria and the final sorting order information to sequentially order the objects on the second carriage while the second carriage remains stationary. In further embodiments, a packager is placed at a predetermined position with respect to the second carriage such that the objects are unloaded from each of the plurality of holders of the second carriage in the sequential order into the packager. Once all of the objects are unloaded, holders are then moved from the second carriage to the first carriage.

In another aspect of the present invention, the method includes reading destination information associated with the objects and placing the objects into separate holders on a first carriage. The separate holders area assigned an assignment number associated with the destination information for the objects placed therein. A final sort order number is also assigned to the unused spaces on a second carriage. The separate holders are slid or moved between the first carriage and the second carriage based on an alignment of the assignment number and the final sort order number in order to sequentially order the objects based on delivery destination.

In further embodiments, the method includes (i) initially moving any of the separate holders from the first carriage to the second carriage based on an alignment of the assignment number and the final sort order number without moving either of the first carriage or the second carriage; or (ii) incrementally rotating the first carriage to align the separate holders with a location on the second carriage based on an alignment of the assignment number and the final sort order number in order to sequentially order the objects on the second carriage while the second carriage remains stationary.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A DETAILED EMBODIMENT OF THE INVENTION

The present invention provides a flexible method for sorting objects such as, for example, flats, mail pieces and other products or parts (generally referred to as flats or mail pieces). In the method of the present invention, only a single feed or pass is required through a feeder system to order and sequence the flats for future delivery. The method of the present invention may also be utilized in warehouse management systems by, for example, sorting products for assembly or internal or external distribution or storage. The method of the present invention provides the flexibility of tracking the flats throughout the entire system while using many known off-the-shelf systems. This reduces manufacturing and delivery costs while still maintaining comparatively superior sorting and delivery results. The method of the present invention also minimizes damage to flats, provides a single drop point, as well as increases the overall efficiency of the off-the-shelf components such as, for example, an optical character recognition system. The present invention is further designed to enable packaging of the flats and to ensure that "tubs" or other transport containers are efficiently utilized by ensuring that the transport containers are evenly filled to a maximum or near maximum level. The present invention may be utilized in any known processing facility ranging from, for example, a postal facility to a host of other illustrative facilities.

Embodiments of the Single Pass Sorting System

Figure 1:
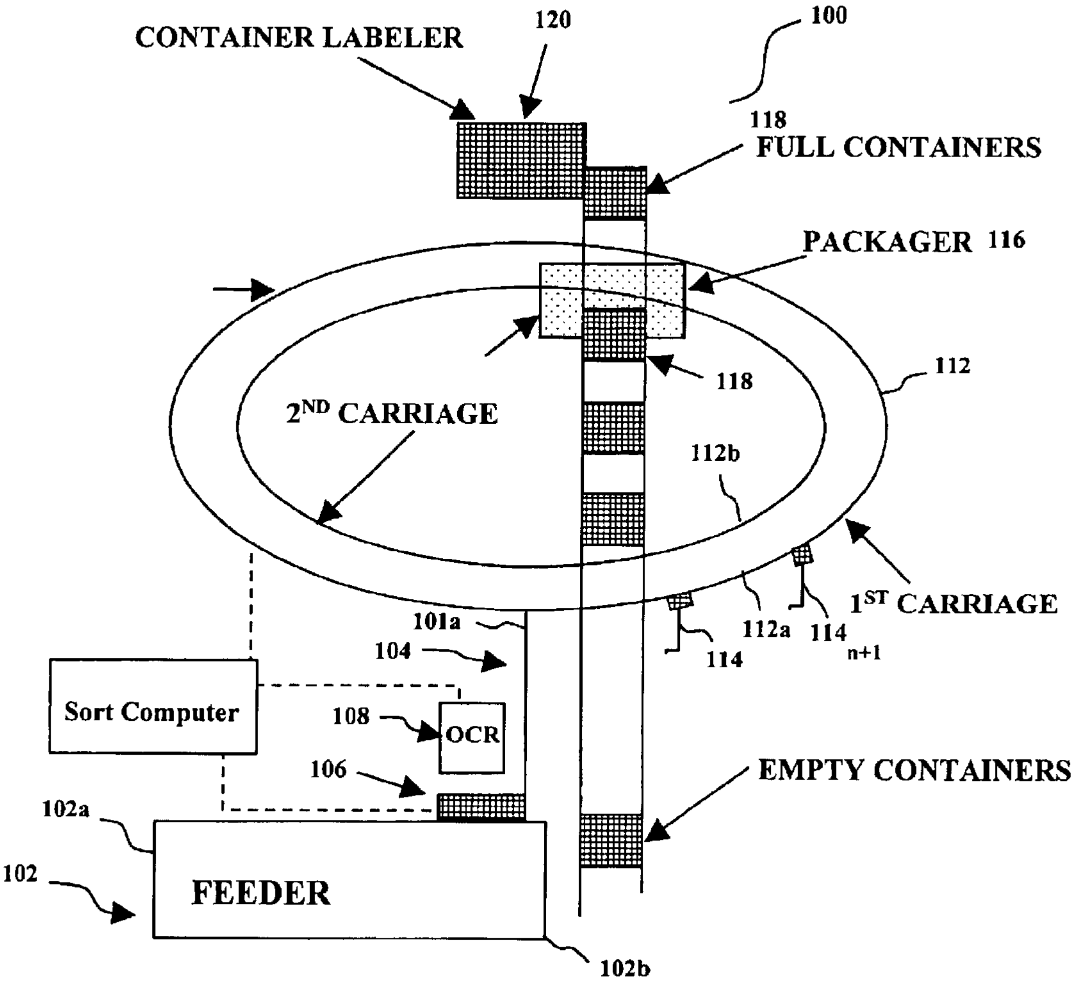
FIG. 1 is an overview of the single pass system utilizing the method of the present invention.

FIG. 1 depicts an overview of a single pass system that utilizes the method of the present invention. It should be readily apparent to those of ordinary skill in the art that the method of the present invention should not be limited to the use with the embodiment of the single pass system shown and described herein. For illustrative purposes only, the single pass system shown in FIG. 1 is discussed for implementing the method of the present invention.

The sorting mechanism is generally depicted as reference numeral 100. The system 100 includes a feeder 102 positioned at a beginning of the process. The feeder 102 may be any known feeder 102 that is capable of transporting flats from a first end 102*a* to a second, remote end 102*b*. In embodiments, the feeder 102 is capable of feeding the stream of flats at a rate of approximately 10,000 per hour. Of course, those of skill in the art should recognize that other feed rates and multiple feeders, depending on the application, might equally be used with the present invention. A transport system or feed track 104 is positioned downstream from the feeder 102, and preferably at an approximate 90° angle therefrom. This angle minimizes the use of valuable flooring space within the processing facility. The feed track 104 may also be at other angles or orientations, depending on the flooring configuration of the processing facility.

A flat thickness device 106 and a scanning device 108 such as, for example, an optical character recognition device (OCR) or the like is provided adjacent the feed track 104. In embodiments, the flat thickness device 106 measures the thickness of each flat as it passes through the system, and the OCR 108 reads the address or other delivery information which is located on the flat. The flat thickness device 106 may be any known measuring device such as a shaft encoder, for example. The flat thickness device 106 and the OCR 108 communicate with a sorting computer 110. The communication may be provided via an Ethernet, Local Area Network, Wide Area Network, Intranet, Internet or the like. The flat thickness device 106 and the OCR 108 provide the thickness and address information to the sort computer 110, at which time the sort computer 110 assigns a virtual code to the flat for delivery and sorting purposes. This is provided via a look-up table or other known method.

Still referring to FIG. 1, at a remote end 104*a* of the feed transport 104 is a cell movement mechanism 112 of the present invention. The cell movement mechanism 112 includes a first carriage or track 112*a* and a second adjacent carriage or track 112*b*. The cell movement mechanism 112 may be any shape such as an oval shape shown in FIG. 1. It should be recognized that other shapes such as circular, serpentine or other shapes that are designed for certain flooring spaces are also contemplated for use by the present invention. In one embodiment, the overall track length may be 167 feet, which translates into a 53 feet diameter or approximately a 45 feet square switch back arrangement. Multiple systems may also be nestable; namely, the system of the present invention may be stacked vertically to more efficiently utilize the flooring space of the processing facility.

In embodiments, a plurality of holders 114, $\mathbf{114}_{n+1}$ extend downward from the first carriage 112*a* or the second carriage 112*b*, depending on the particular stage of the process. The plurality of holders 114, initially extending from the first carriage 112*a*, may each be assigned a numerical designation, code or the like corresponding to the order of the holders 114 on the first carriage 112*a* or the designations associated with the flats placed therein. In one embodiment of the present invention, any number of holders 114 may extend from the first carriage 112*a* and the second carriage 112*b*. But, in one preferred embodiment, approximately 1000 holders 114 extend downward therefrom. The holders 114 are designed to (i) capture and hold the flats as they are conveyed from the feed transport 104, (ii) move about the first carriage 112*a* and the second carriage 112*b*, as well as (iii) move between the first carriage 112*a* and the second carriage 112*b*. The movement between the first carriage 112*a* and the second carriage 112*b* is provided via a sliding actuator mechanism (not shown). The sort computer 110 tracks each holder in addition to the flats loaded therein, and assigns codes to the holders and positions of the holders (as discussed below). In this manner, the sort computer 110 is capable of accurately following each flat throughout the system for future sorting.

FIG. 1 further shows an optional packager 116 at a certain predetermined position with respect to the cell movement mechanism 112, and preferably aligned with the second carriage 112*b*. (Those of skill in the art will recognize that multiple packagers can also be used with the present invention.) The packager 116 is designed to package the flats as they are unloaded from the holders 114 extending from the second carriage 112*b*. The packager 116 then transports the flats to containers 118 that are provided with a label at container labeler 120. In embodiments and due to the tracking of the thickness of each flat, the system of the present invention is capable of determining the height of the flats in each container 118 thus ensuring maximum use of each container.

Operation of Use

Figure 2A:
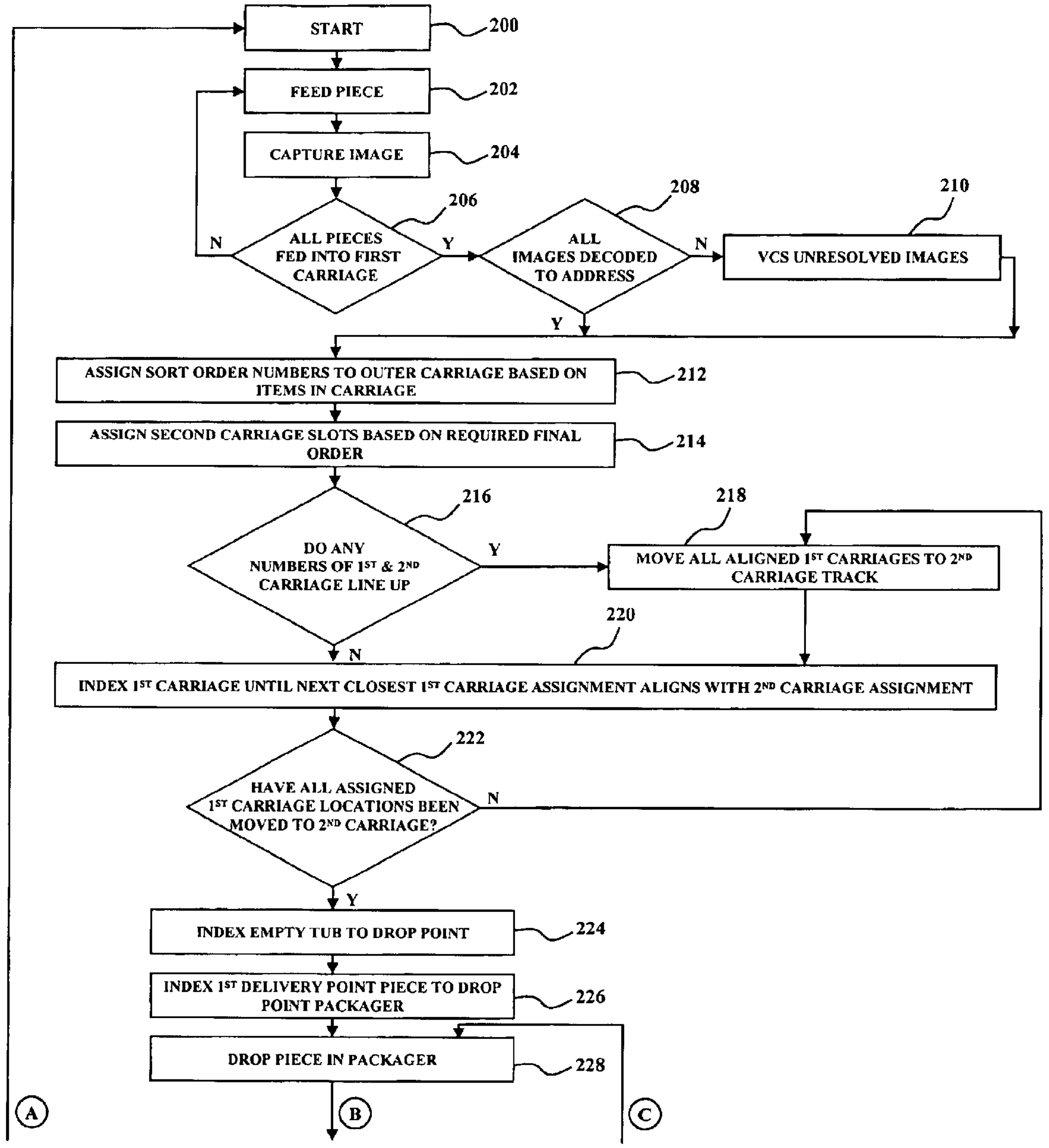
FIGS. 2*a* and 2*b* are flow charts implementing the steps of the present invention using the single pass system.
Figure 2B:
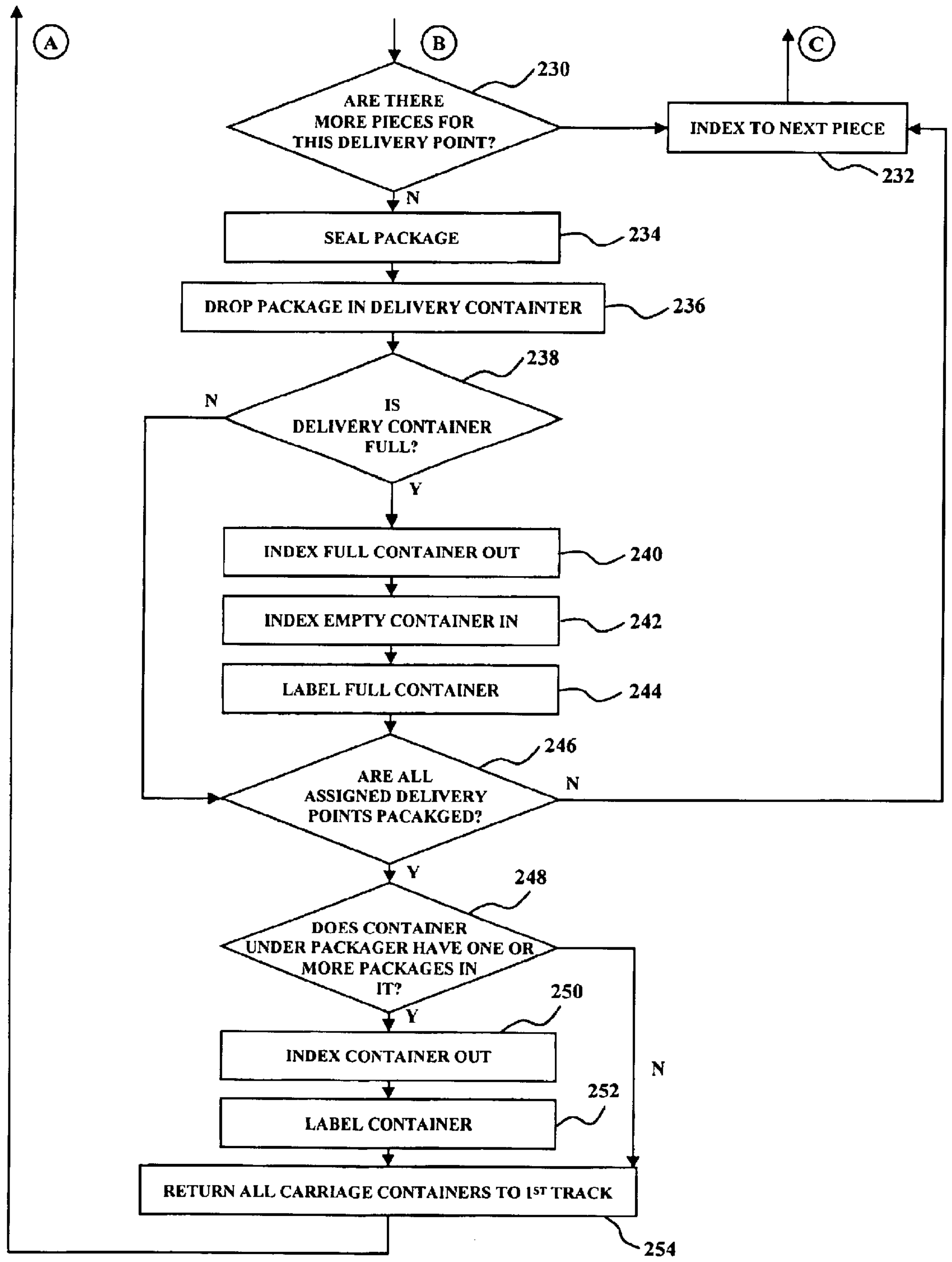

FIGS. 2*a* and 2*b* are flow diagrams showing the steps implemented by the present invention. The steps of the present invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation or the sort computer over the Internet or some other type of network. FIGS. 2*a* and 2*b* may equally represent a high-level block diagram of the system of the present invention, implementing the steps thereof.

In step 200, the control begins. In step 202, a piece of mail or other product or part (referred hereinafter as a flat) is fed into the system. In step 204, the image of the flat is captured, which preferably includes the address information. In step 206, a determination is made as to whether all of the flats are fed into the holders of the first carriage. If yes, a determination is made, in step 208, as to whether all of the images are decoded to address. If not, then all unresolved images are resolved in step 210. Once all of the images are resolved or decoded, then a sort number or code (i.e., sorting criteria) is assigned to each of the holders of the first carriage based on the specific flat in the holder (step 212) (or, in embodiments, the order of the holders, themselves). In step 214, a number or code (i.e., a final order sorting information also referred to as a number or code) is assigned to the slots or unused spaces on the second carriage based on the final order of delivery of the flat. These slots will eventually accommodate the holders, as discussed below. In step 216, a determination is made as to whether any of the numbers or codes assigned to the holders of the first carriage aligns with the numbers or codes assigned to the slots of the second carriage. If yes, then, in step 218, all of such aligned holders are moved from the first carriage to the second carriage position.

If there are no alignments then, in step 220, the first carriage is indexed until at least one assigned number or code associated with the holder on the first carriage is aligned with an assigned number or code of the second carriage. The indexing is preferably a single, incremental turn of the first carriage in either the clockwise or counter clockwise direction. Next, in step 222, a determination is made as to whether all of the assigned numbers associated with the holders in the first carriage have been moved to the appropriate locations on the second carriage. If not, steps 218 and 220 are repeated. If yes, then an empty container or tub is indexed to the drop point, in step 224, preferably below a point associated with the second carriage. In step 226, the second carriage is indexed so the first delivery point is over the drop point for packaging (referred to as the packager point). The flat is then dropped in the packager in step 228.

In step 230, a determination is made as to whether there are additional flats for dropping into the packager for the particular delivery point. If there are additional flats then, in step 232, the system is indexed and steps 228 and 230 are repeated. If there are no additional flats, then, in embodiments, the flats are sealed as a package in step 234. The package is then dropped in a delivery container in step 236.

Still referring to FIGS. 2*a* and 2*b*, in step 238, a determination is made as to whether the delivery container is full. This might be performed by first measuring the thickness of the flats placed in the delivery container, prior to the placement thereof. If the delivery container is full, then the full delivery container is indexed to a next position in step 240. In step 242, a next delivery container is indexed to the package drop point and, in step 244, the full container is labeled. Of course, these steps do not necessarily have to occur in such order.

If the determination in step 238 is negative or after step 244, a determination is made as to whether all assigned flats for all delivery points are packaged (step 246). If not, then the method returns to step 232. If so, then a determination is made as to whether the delivery container has at least one or more flats, in step 248. If yes, then the delivery container is indexed out (step 250) and labeled (step 252). Then all of the holders are returned to the first carriage in step 254. The process will then begin again in step 200.

EXAMPLE OF USE

In a typical example used for illustrative purposes only and not to limit the scope of the present invention, 1000 pieces of flats may be accommodated with the use of the present invention based on 500 delivery points. The mail stream or flats are first fed through the automated feeder 102 at approximately 10,000 per hour. This translates into a feed operation of 0.1 hour. In the feed track 104, the flat image is acquired by the OCR 108 and decoded for its destination information (a code is assigned thereto). In addition, mail thickness information is acquired at the flat thickness device 106. The destination and thickness information is stored in the sort computer 110, preferably within a database. The flat is then injected into a holder 114 of the carriage track 112*a*. This process continues until all of the holders are filled or there are no more flats. In one example, the sort operation is three seconds per transfer thus translating into 0.83 hours for 1000 flats. The sort computer 110 also tracks placement of the flats within the holders 114. Also, each holder 114, on the first carriage 112*a*, is assigned a sequential number for sorting purposes. The sort computer 110 asks for definition of all pieces that the OCR could not decode so that this process may be performed manually during the feed process.

At the completion, the sort computer 110 establishes a sort order for each flat in the first carriage 112*a*. The second carriage 112*b* is also assigned numbers or codes corresponding to the sequential order of the final completed sort. The first carriage 112*a* is now incremented (one by one) up to a full rotation so all the assigned numbers align between the first carriage 112*a* and the second carriage 112*b*. As the numbers align during this incrementing process, each holder 114 is moved from the first carriage 112*a* to the second carriage 112*b*. All holders 114 that contain flats will be moved from the first carriage 112*a* to the second carriage 112*b* within one complete revolution of the track.

Up to now, the second carriage 112*b* has remained stationary. At this point, however, all of the flats are in sequential order for delivery on the second carriage 112*b*, being transported from the first carriage 112*a*. The second carriage 112*b* now moves the flats sequentially to the unload point that has the optional packager 116. Flats are dropped from the holder 114, in delivery order, into the packager 116 up to the amount required for a single delivery point. These flats may then be packaged and dropped into the empty tub or container 118 until the container 118 is full based on piece thickness, at which point a new empty container is indexed into place and the full container is labeled at optional labeler 120. This continues until all pieces are in the containers 118.

Figure 3:
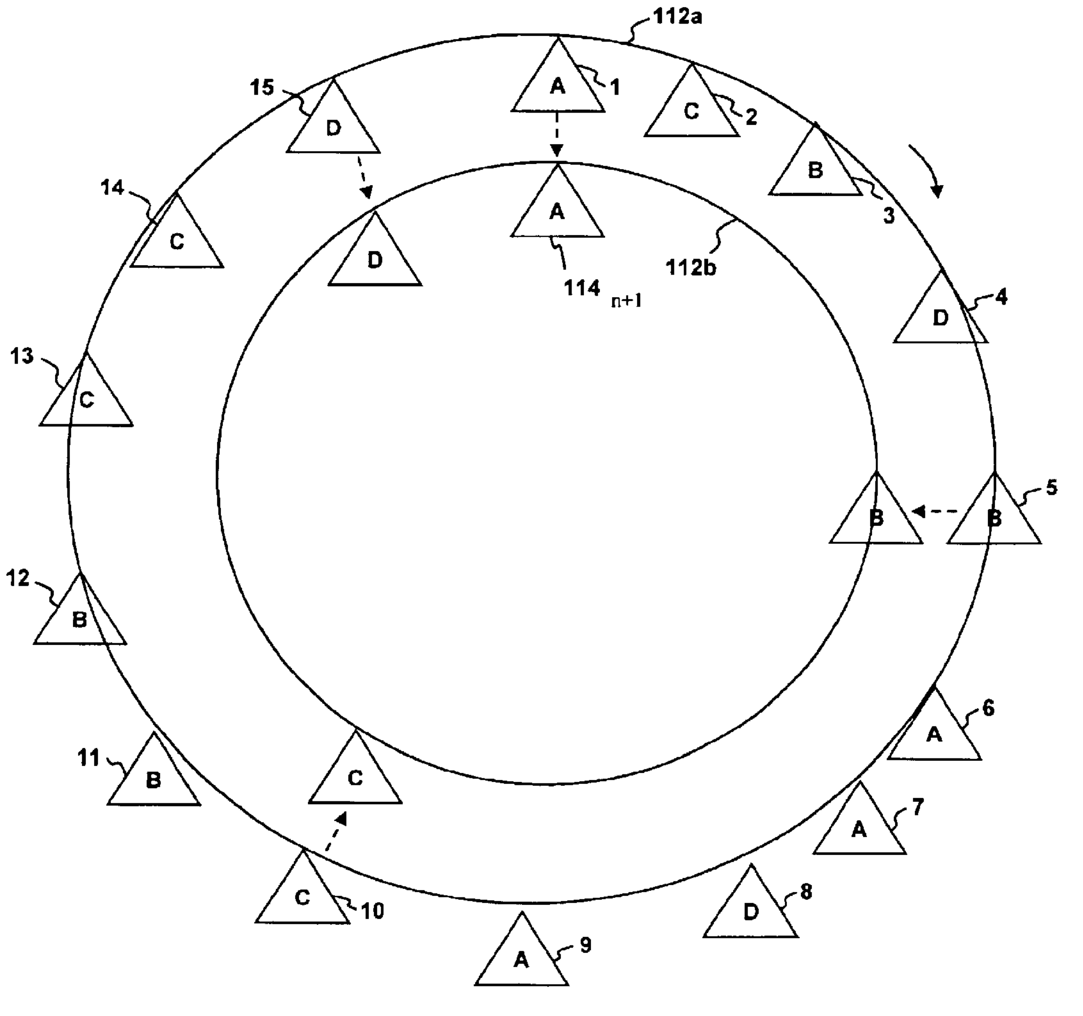
FIG. 3 shows a highly diagrammatic representation of the method of the present invention.

FIG. 3 shows a highly diagrammatic representation of the above process and is provided for illustrative purposes only. FIG. 3 shows the first and second carriages 112*a* and 112*b* with respective flats placed in holders $\mathbf{114}_{n+1}$. Initially, the holders $\mathbf{114}_{n+1}$ are positioned on the first carriage 112*a*, each being assigned a sequential number 1–15, for example. The sort computer 110 tracks the holders 1–15 and the flats (designated "A" through "D" based on delivery destination). Once all of the holders $\mathbf{114}_{n+1}$ are filled, the sort computer 110 determines whether any numbers assigned between the first and second carriage 112*a* and 112*b* are aligned. If so, then these holders are moved from the first carriage to the second carriage 112*b*. In the example of FIG. 3, the $1^{st}$, $5^{th}$, $10^{th}$ and $15^{th}$ holders of the first carriage 112*a* are initially aligned and moved to the second carriage 112*b*. The first carriage 112*a* is then rotated, and the determination of alignment and movement is then performed again. The next alignment would be at the $3^{rd}$ incremental alignment where at least the $3^{rd}$ holder ("B" destination flat) would be aligned with the sixth place in the second carriage 112*b*. At this time, the $3^{rd}$ holder would be moved to the second carriage 112*b*. This process occurs until all of the holders in the first carriage 112*a* are moved to the second carriage 112*b*, in the delivery order (i.e., all "A" though "D" delivery destinations are each grouped together and hence aligned sequentially). As now should be understood, the sort computer 110, while keeping track of all of the holders 114 and the contents therein, makes the determination of when to move the holders 114 from the first carriage 112*a* to the second carriage 112*b* for delivery sequencing. Once in the proper sequence, the second carriage 112*b* is then incrementally moved and the contents in the holders 114 are loaded into the containers, as described above.

While the invention has been described in terms of preferred embodiments, those skilled in the art will recognize that the invention can be practiced with modifications and in the spirit and scope of the appended claims.

Having thus described our invention, what we claim as new and desire by Letters Patent is as follows:

1. A method for sorting objects based on destination point, comprising:

reading destination information associated with objects;

assigning a code based on the destination information to each of the objects;

placing the objects each in one of a plurality of holders on a first carriage and assigning sorting criteria to each of the plurality of holders based on the code of the each of the objects within each of the plurality of holders; and instructing at least one of the plurality of holders to move from the first carriage to a corresponding position on a second carriage based on the sorting criteria to sequentially order the objects based on delivery destination.

2. The method according to claim 1, further comprising assigning final sorting order information to locations on the second carriage.

3. The method according to claim 2, wherein the instructing step includes moving the at least one of the plurality of holders from the first carriage to the second carriage based on an alignment between the sorting criteria and the final sorting order information.

4. The method of claim 2, further comprising incrementally moving the first carriage to align at least one of the plurality of holders with one of the locations on the second carriage based on an alignment of the sorting criteria and the final sorting order information to sequentially order the objects on the second carriage while the second carriage remains stationary.

5. The method of claim 1, further comprising determining whether the plurality of holders are moved from the first carriage to the second carriage based on the sorting criteria and the final sorting order information and, if so, dropping each of the objects into a packager for a specific delivery point.

6. The method of claim 5, further comprising determining whether there are additional objects in any of the plurality of holders for the specific delivery point and, if so, continuing to drop each of the objects into the packager for the specific delivery point.

7. The method of claim 5, further comprising determining whether there are additional objects for the specific delivery point and, if not, then packaging the objects into a package for the specific delivery point.

8. The method of claim 7, further comprising placing the package into a delivery container.

9. The method of claim 8, further comprising measuring a thickness of the objects to determine when the delivery container is full.

10. The method of claim 8, further comprising providing labels on the delivery container.

11. The method of claim 9, further comprising indexing the delivery container to a new position and placing another delivery container for filling with objects.

12. The method of claim 8, further comprising determining whether the delivery container has one or more packages contained therein and, if so, moving the delivery container to another location.

13. The method of claim 12, further comprising labeling the delivery container.

14. The method of claim 1, further comprising placing a packager or packagers at a predetermined position with respect to the second carriage such that the objects are unloaded from each of the plurality of holders of the second carriage in the sequential order into the packager.

15. A method for sorting objects based on destination point, comprising:

reading destination information associated with objects;

assigning a code based on the destination information to each of the objects;

placing the objects each in one of a plurality of holders on a first carriage and assigning sorting criteria to each of the plurality of holders based on the code of the each of the objects within each of the plurality of holders;

instructing at least one of the plurality of holders to move from the first carriage to a corresponding position on a second carriage based on the sorting criteria to sequentially order the objects based on delivery destination; and moving each of the holders from the second carriage to the first carriage when all of the objects are unloaded to a packager from the second carriage.

16. The method of claim 1, wherein the sequentially ordering of the objects based on delivery destination is provided in a single pass.

17. The method of claim 1, wherein assigning sorting criteria to each of the plurality of holders is provided after the objects are associated with a respective holder of the plurality of holders.

18. The method of claim 1, wherein only a single object is placed in each of the plurality of holders.

19. A method for sorting objects based on destination point, comprising:

reading destination information associated with objects;

assigning a code based on the destination information to each of the objects;

placing a single object in each of a plurality of holders on a first carriage and assigning sorting criteria to each of the plurality of holders based on the code of the each of the objects within each of the plurality of holders; and instructing each of the plurality of holders having the single object therein to transfer from the first carriage to a corresponding position on a second carriage based on the sorting criteria to sequentially order the objects based on delivery destination.

20. The method of claim 19, further comprising incrementally moving the first carriage to align at least one of the plurality of holders with one of the locations on the second carriage while the second carriage remains stationary.

21. The method of claim 19, further comprising moving the first carriage concentrically about the second carriage.

22. The method of claim 19, further comprising sequentially ordering the objects in a single pass.

* * * * *